United States Patent [19]

Thomas

[11] Patent Number: 4,526,341
[45] Date of Patent: Jul. 2, 1985

[54] PNEUMATIC SHUT-OFF VALVE

[75] Inventor: John H. Thomas, Pittsburgh, Pa.

[73] Assignee: Kerotest Manufacturing Corp., Pittsburgh, Pa.

[21] Appl. No.: 504,628

[22] Filed: Jun. 15, 1983

[51] Int. Cl.³ .............................................. F16K 41/10
[52] U.S. Cl. .................................. 251/63.5; 251/367; 251/335.3
[58] Field of Search ....................... 251/63.6, 61.4, 87, 251/63.5, 63.4, 335 B, 214, 367

[56] References Cited

U.S. PATENT DOCUMENTS

| | | | |
|---|---|---|---|
| 862,867 | 8/1907 | Eggleston | 417/390 |
| 2,265,496 | 12/1941 | Shaw | 251/335 B |
| 3,312,446 | 4/1967 | Koch et al. | 251/61.4 |
| 3,491,789 | 1/1970 | Callahan, Jr. | 251/335 B |
| 3,734,455 | 5/1973 | Natho et al. | 251/62 |
| 3,958,592 | 5/1976 | Wells et al. | 251/63.6 |
| 3,990,680 | 11/1976 | Massey, Jr. | 251/335 B |
| 4,201,366 | 5/1980 | Danko | 251/335 B |
| 4,237,920 | 12/1980 | Norman | 251/87 |
| 4,421,293 | 12/1983 | Koch et al. | 251/61.4 |
| 4,431,159 | 2/1984 | Stubbs | 251/63.6 |

FOREIGN PATENT DOCUMENTS 940679 10/1963 United Kingdom ............... 251/63.6

Primary Examiner—Samuel Scott
Assistant Examiner—Helen Ann Odar
Attorney, Agent, or Firm—Stanley J. Price, Jr.; John M. Adams

[57] ABSTRACT

A valve body includes a chamber for the flow of fluid between an inlet and an outlet thereto. The chamber includes an upper portion with an opening therethrough and a lower portion including a valve seat between the inlet and outlet. A bonnet is positioned in the chamber upper portion and is connected to the valve body and extends upwardly therefrom. The bonnet includes a passageway, and a stem is positioned in the passageway for longitudinal movement into and out of sealing relation with the valve seat. An air operator is connected to the upper end of the stem and is connected to a source of fluid under pressure, such as compressed air, which is supplied by remote control to the air operator to control reciprocation of the stem to open and close the valve. The air operator includes a base connected to the bonnet in surrounding relation with the stem and positioned in spaced relation with a piston connected to the upper end of the stem to thereby form a fluid chamber. A housing encloses the piston and the base. Pressurized air is admitted and released to and from the chamber for reciprocating the piston to open and close the valve. A compression spring acts on the stem to normally maintain the valve closed. Supplying compressed air to the chamber exerts an upward force on the piston to raise the stem and compress the spring to open the valve. Sliding seal means is provided on the piston for maintaining a seal between the piston and housing as the piston is reciprocated. The housing is rotatably supported on the base to permit selective positioning of the passageway to accommodate connection of the air operator to a source of compressed air.

11 Claims, 1 Drawing Figure

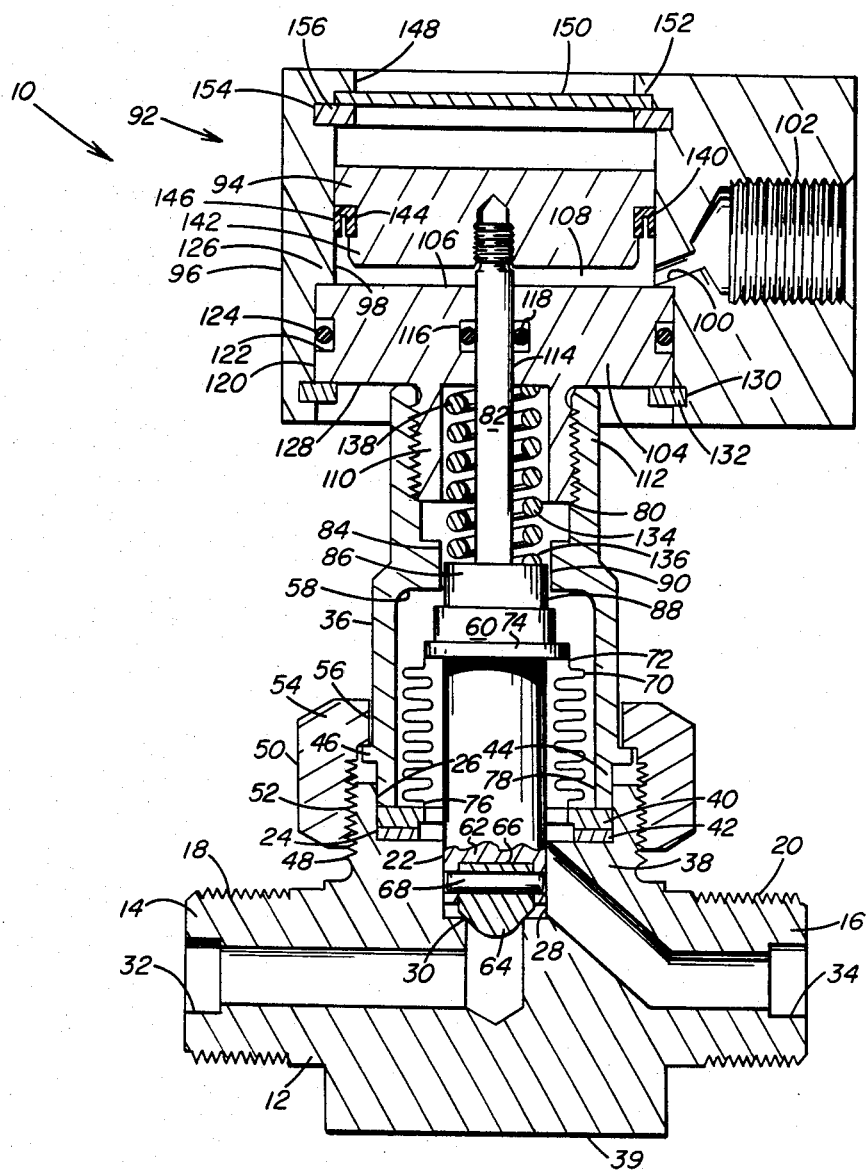

PNEUMATIC SHUT-OFF VALVE

BACKGROUND OF THE INVENTION

1. Field of the Invention

This invention relates to a valve and, more particularly, to a fluid actuated shut-off valve having a valve stem connected to a reciprocal piston positioned in a housing which forms a sealed fluid chamber around the piston and is rotatably mounted on a base to permit selective positioning of the housing for connection to a source of pressurized fluid.

2. Description of the Prior Art

Shut-off valves that are provided with an actuator which is remotely controlled, such as a pneumatic or hydraulic actuator, are well known in the art. U.S. Pat. No. 4,201,366 discloses in a bellows valve a remotely operable air actuator connected to the upper end of a valve stem having a lower end sealed within a bellows. Supplying compressed air to the operator lifts the valve stem off the valve seat to open the valve. On loss of the actuating air pressure, the valve stem is automatically lowered by the biasing force of a compression coil spring to close the valve. Thus, the valve is normally maintained closed in the absence of air pressure to the air operator. Other remote controlled valves are disclosed in U.S. Pat. Nos. 3,789,875; 3,913,883; 3,958,592; 3,993,284; 4,274,432 and 4,306,583.

A frequently encountered problem with remotely operated pneumatic valves is a loss of fluid pressure in the chamber of the air operator. The air operator includes a piston which is reciprocally movable in a housing. The piston must be free to reciprocate, while at the same time, a fluid-tight seal must be maintained around the piston as it reciprocates to prevent loss of the fluid pressure for opening the valve and maintaining the valve in an open position. The air operator seals, therefore, must be operable to maintain a sliding seal. This requires the seal around the piston to be operable to sustain many cycles of reciprocation without wear and resistant leakage.

A further problem frequently encountered in remotely controlled pneumatic shut-off valves is the mounting and connection of the valve to a supply of pressurized air. In many applications, the valve is positioned where connection of the operator to an air supply is difficult to complete because of limited space around the valve and the relative position of the part of the air operator to which the supply line is connected.

Therefore, there is need in a remotely operable pneumatic shut-off valve to provide an air operator that is movable to a selective position to facilitate east of connection to the air supply line.

SUMMARY OF THE INVENTION

In accordance with the present invention, there is provided a valve that includes a valve body having a valve chamber therein. The valve chamber includes an upper portion with an opening therethrough and a lower portion having a valve seat. Inlet and outlet openings extend through the valve body and communicate with the valve seat. A bonnet is positioned in the valve upper portion and is connected to the valve body. The bonnet has a passageway therethrough aligned with the valve chamber. A stem is positioned for longitudinal movement in the bonnet passageway and includes a lower end portion extending into the valve chamber lower portion and is adapted to sealingly engage the valve seat to thereby open and close the valve. The stem includes an upper end portion extending above the bonnet. The piston is connected to the stem upper end portion. The base is connected to the bonnet in surrounding relation with the stem and is positioned in spaced relation with the piston to form a fluid chamber therebetween. A housing encloses the piston and the base. The housing has internal wall. The piston is slidable on the internal wall. A passageway extends through the housing and communicates with the fluid chamber for admitting and releasing pressurized fluid to and from the fluid chamber for reciprocating the piston to open and close the valve. First seal means between the base and the housing internal wall maintains a fluid-tight seal between the housing and the base. Second seal means supported by the piston and positioned between the piston and the housing internal wall maintains a fluid-tight therebetween as the piston reciprocates in the fluid chamber. A compression coil spring is positioned on the stem and abuts the base on one end and acts on the stem at the other end. The coil spring exerts a force on the stem to normally maintain the stem lower end portion engaging the valve seat in the absence of fluid in the fluid chamber to exert an upward force on the piston to raise the stem and open the valve.

Further, in accordance with the present invention, there is provided a valve that includes a valve body having a valve chamber therein. The valve chamber includes an upper portion with an opening therethrough and a lower portion having a valve seat. Inlet and outlet openings extend through the valve body and communicate with the valve seat. A bonnet is positioned in the chamber upper portion and is connected to the valve body. The bonnet has a passageway therethrough aligned with the chamber. A stem is positioned for longitudinal movement in the bonnet passageway and includes a lower end portion extending into the chamber lower portion and being adapted to sealingly engage the valve seat to thereby open and close the valve. The stem includes an upper end portion extending above the bonnet. A piston is connected to the stem upper end portion. A base extends into the bonnet passageway and surrounds the stem upper end portion. Means is provided for securing the base to the bonnet to position the base in spaced relation with the piston to form a fluid chamber therebetween. A housing encloses the piston and the base. The housing has an internal wall for supporting the piston for reciprocal movement in the fluid chamber. The housing has a lower end portion rotatably supported by the base. The housing has an upper end portion and a passageway extending through the housing between the upper and lower end portions. The passageway communicates with the fluid chamber for admitting and releasing pressurized fluid to and from the fluid chamber for reciprocating the piston to open and close the valve. Retaining means connects the housing to the base at the housing lower end portion to permit rotation of the housing on the base to position the passageway at a preselected location around the base.

Accordingly, the principal object of the present invention is to provide a pneumatic shut-off valve that includes an air operator having a reciprocal piston connected to a stem and movable in a fluid chamber which is maintained pressurized upon reciprocation of the piston to open and close the valve.

Another object of the present invention is to provide in a remote controlled shut-off valve an air actuator that is rotatively supported in a manner to facilitate selective positioning of the pressure inlet port to an air supply line.

Another object of the present invention is to provide a bellows sealed valve that is connected to an air operator for remote control of the valve.

These and other objects of the present invention will be more completely disclosed and described in the following specification, the accompanying drawings, and the appended claims.

BRIEF DESCRIPTION OF THE DRAWING

FIG. 1 is a sectional view in side elevation of a remotely controlled bellows sealed shut-off valve.

DESCRIPTION OF THE PREFERRED EMBODIMENT

Referring to the FIGURE, there is illustrated a remotely controlled shut-off valve, of the bellows type, generally designated by the numeral 10 for controlling the flow of fluid such as a corrosive, toxic, or expensive liquid or gas, through a piping system in which the valve 10 is operable to provide leak-type shut-off in the piping system. The valve 10 includes a valve body 12 having pair of conduit portions 14 and 16 that preferably include externally threaded portions 18 and 20 adapted to receive suitable compression couplings for connection to the conduits of the piping system.

The valve body 12 includes a chamber 22 having an upper portion 24 with an opening 26 therethrough and lower portion 28 having a valve seat 30 therein. The conduit portions 14 and 16 include openings 32 and 34 respectively communicating with the chamber 22 for fluid flow from the conduit portions 14 and 16 through the valve seat 30.

A bonnet 36 is positioned in the chamber upper portion 24 and closes the opening chamber 26. The chamber upper portion 24 forms a counterbore in the valve body 12 and is adapted to receive on a shoulder 38 of the valve body 12 a bellows plate 40 and a gasket 42. Both the bellows plate 40 and the gasket 42 are supported by the valve body 12 surrounding the upper chamber portion 24 and include bores therethrough having a diameter greater than the diameter of the chamber 22 above the valve seat 30. The bonnet 36 has a lower end portion 44 that bears downwardly on the bellows plate 40. The lower end portion 44 includes an external shoulder 46 positioned above the valve body 12. The valve body 12 includes an external threaded portion 48 positioned below the bonnet shoulder 46. The base 39 of the valve body 12 can be provided with tapped holes (not shown) to facilitate bottom mounting of the valve 10.

The union nut 50 includes an internally threaded bore 52 and an internal shoulder 54 surrounding a bore 56. The union nut 50 is advanced downwardly in surrounding relation with the bonnet 36 to a position where the bore 56 surrounds the bonnet 36 above the shoulder 46 and the nut internally threaded bore 52 engages the valve body externally threaded portion 48. The nut 50 is threadedly advanced downwardly onto the valve body 12 so that the nut shoulder 54 bears against the bonnet shoulder 46 to urge the bonnet lower end portion 44 into bearing engagement with the bellows plate 40. Continued tightening of the nut 50 on the valve body 12 compresses the gasket 42 on the valve body shoulder 38.

Thus compression of the gasket 42 provides a fluid tight seal between the bonnet 36 and the valve body 12 around the valve chamber opening 26.

The bonnet 36 has a passageway 58 therethrough aligned with the valve body 22. A valve stem 60 is positioned in the bonnet passageway 58 and includes a lower end portion 62 positioned in the chamber lower end portion 28. In the closed position of the valve 10, as illustrated in the FIGURE, the stem lower end portion 62 sealingly engages the valve seat 30 to prevent fluid flow through the valve body 12 between the openings 32 and 34. In the open position of the valve 10 the stem lower end portion 62 is raised out of contact with the valve seat 30 to permit fluid flow through the valve seat 30 and the valve body 12 between the openings 32 and 34.

Preferably the stem lower end portion 62 includes a replaceable stem insert 64 fabricated of a chemically resistant material, such as plastic. The stem insert 64 is secured within a recess 66 of the stem 60 by a stem pin 68. With this arrangement the stem insert 64 is replaceable on the end of the stem 60 to permit a selection of stem tip materials and permit replacement of the stem insert 64 when worn.

A fluid impervious bellows 70 surrounds the stem lower end portion 62 in the bonnet passageway 58. The bellows 70 is preferably fabricated of metallic material, such as stainless steel, and includes an upper end portion 72 welded to an integral flange 74 on the stem 60. A lower end portion 76 of the bellows 70 extends into the bore of the bellows plate 40 and is welded to the bellows plate 40.

With this arrangement, the bellows 40 hermetically seals the stem lower end portion 62 within a primary pressure boundary that contains the fluid flowing through the valve 10 within the bellows 70 around the stem 60. Thus, in the event fluid leaks upwardly through the valve seat 30 and around the stem 60 into the valve chamber upper portion 24, the fluid is contained within the bellows 70. The stem 60 is nonrotatably, longitudinally movable in the bonnet passageway 58. As the stem 60 is raised into and out of sealing engagement with the valve seat 30, the bellows 70 is longitudinally expandable and retractable to maintain a hermetic seal around the stem lower end portion 62.

The bonnet passageway 58 includes a lower end portion 78 for receiving the bellows 70 and the stem lower end portion 62. An upper end portion 80 of the passageway 58 receives an upper end portion 82 of the stem 60. The passageway portions 78 and 80 are separated by a contricted stem opening 64 through which the stem 60 is nonrotatably, longitudinally movable. The stem 60, between the lower end portion 62 and the upper end portion 82, includes an intermediate portion 86 having an outer surface formed by a plurality of planar surfaces or flats 88. The constricted stem opening 84 is noncircular and is formed by a plurality of planar surfaces 90 positioned in opposed, abutting relation with the stem flats 88. This arrangement serves to prevent rotation of the stem 60 as it is raised and lowered to open and close the valve 10. Contact of the planar surfaces 90 of the bonnet 36 with the stem flats 88 prohibits rotation of the stem 60 as the stem 60 moves longitudinally up and down in the bonnet passageway 58.

Operation of the valve 10 between the opened and closed positions is remotely controlled by an air operator assembly generally designated by the numeral 92. The air operator assembly 92 includes a piston 94 reciprocally movable in a housing 96. The piston 94 is connected to the stem upper end portion 82 to move vertically with the stem 60. The housing 96 includes an internal wall 98 through which extends a passageway 100 communicating with an inlet port 102 adapted for connection to a fitting (not shown) of a supply line that connects the air operator assembly 92 to a source of fluid under pressure, such as air. The housing 96 is rotatably mounted on a base 104 having an upper surface 106 positioned opposite the piston 94 to thereby form a fluid chamber 108 for receiving fluid under pressure through the inlet 102 and passageway 100.

The base 104 has an externally threaded lower end portion 110 which threadedly engages an upper end portion 112 of the bonnet 36. The base 104 also includes a bore 114 through which the valve stem upper end portion 82 extends. The valve stem upper end portion 82 is movable in the base bore 114. An enlarged recess 116 extends outwardly from the bore 114, and an O-ring 118 is retained in the recess 116 in sealing engagement with the valve stem 60 to provide a seal around the valve stem 60.

The base 104 also includes an external surface 120 that contacts the housing internal wall 98 below the passageway 100. A circumferential recess 122 is provided on the surface 120. An O-ring 124 is received within the recess 122 to sealingly engage the housing internal wall 98 to provide a seal between the base 104 and housing 96 to prevent the escape of fluid therebetween from the fluid chamber 108.

The housing 96 includes a shoulder 126 on the internal wall 98. The shoulder 126 abuts the outer periphery of the base upper surface 106. In this manner the housing 96 is securely supported by the base 104 which is, in turn, securely connected to the upper end of the bonnet 36. Accordingly, the base 104 is threadedly advanced into connection with the bonnet upper end portion 112 until a lower surface 128 of the base 104 abuts the extreme upper end of the bonnet 36. The housing 96 is provided with an annular recess 130 in the internal wall 98 opposite the base lower surface 128. A retaining ring 132 is adapted for releasable insertion in the annular recess 130 to engage the base lower surface 128. In this manner, the housing 96 is rotatably connected to the base 104.

Removal of retaining ring 132 is not required to rotate the housing 96. The housing 96 is rotatable to selectively position the inlet port 102 in a preselected position around the base 104 on the bonnet 36. Accordingly, the air operator assembly 92 can be mounted on the valve bonnet 36 in a position where the housing 96 is rotated to a position to accommodate the connection of an air supply line to the housing inlet port 102.

The valve stem 60 is normally maintained in a closed position as illustrated in the FIGURE by the action of a compression coil spring 134 mounted on the stem 60 to exert a downward force on the stem 60. The spring 134 includes a lower end portion 136 that abuts the stem intermediate portion 86 above the flats 88 and upper end portion 138 that abuts the base lower surface 128. Thus, with this arrangement, the spring 134 is compressed between the stem portion 86 and the base 104 to normally exert a downward force upon the stem 60 to maintain the stem insert 64 in sealing engagement with the valve seat 30 in the absence of fluid pressure in the chamber 108.

In operation to open the valve so that the stem insert 64 is removed from the valve seat 30, fluid under pressure is admitted into the fluid chamber 108 through the inlet port 102 and the passageway 100. Pressurizing the chamber 108 exerts an upward force upon the piston 94 overcoming the downward force exerted on the valve stem 60 by the spring 134 to raise the valve stem 60. This compresses the spring 134 between the stem intermediate portion 86 and the base lower surface 128. Accordingly, releasing fluid from the chamber 108 reduces the upward pressure exerted upon the piston 94 and when the force of the spring 138 exceeds the fluid pressure exerted on the piston 94, the stem 60 move downwardly to close the valve. Thus the valve 10 is operable between either the fully opened or the fully closed positions.

As the piston 94 is reciprocated within the housing 96 during operation of the valve 10, a fluid tight seal is maintained between the piston 94 and the internal wall 98 of the housing 96 by the provision of a sliding seal 140. The sliding seal 140 preferably includes an annular spring energized piston seal having an inverted U-shaped configuration. Most preferably the seal 140 is fabricated of TEFLON. The annular seal 140 is retained on the peripheral surface of a head portion 142 of the piston 94. The peripheral surface of the head portion 142 is recessed to receive and retain an inner edge or lip 144 of the seal 140 while an outer edge or lip 146 of the seal 140 is positioned for slidable movement on the housing interior wall 98. With this arrangement, the seal 140 is securely connected to the piston 34 and operable to be maintained in sealing engagement with the housing internal wall 98 to prevent escape of fluid upwardly through the housing 96 between the piston 94 and the wall 98. Also this sliding seal arrangement is operable to withstand repeated reciprocation of the piston 94 without a loss of pressure in the chamber 108.

The housing 96 includes an open upper end portion 148 which is closed off by an air operator disc 150. The disc 150 is positioned on an internal shoulder 152 of the housing 96. An annular recess 154 is positioned in the internal wall 98 below the shoulder 152. A retaining ring 156 is received in the recess 154 in underlying relation with the disc 150. The ring 156 abuts the outer peripheral edge of the disc 150 and urges the disc 150 upwardly into secure engagement with the housing internal shoulder 152. In this manner, the disc 150 is securely connected to the housing 96 and thereby closes off the housing open upper end portion 148 to protect the interior of the housing 96 from the entry of moisture and foreign debris. Thus, with the present invention, there is provided an air operator assembly 92 that is securely and adjustably mounted on the bonnet 36 and is sealed to contain the fluid pressure to assure positive operation of the valve 10 after repeated cycles without loss of operating pressure.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:
1. A valve comprising,
a valve body having a valve chamber therein,
said valve chamber including an upper portion with an opening therethrough and a lower portion having a valve seat, inlet and outlet openings extending through said valve body and communicating with said valve seat, a bonnet positioned in said chamber upper portion and connected to said valve body, said bonnet having a passageway therethrough aligned with said chamber, a stem positioned for longitudinal movement in said bonnet passageway and including a lower end portion extending into said chamber lower portion and being adapted to sealingly engage said valve seat to thereby open and close the valve, said stem including an upper end portion extending above said bonnet, a piston connected to said stem upper end portion, said piston including an outer cylindrical surface and an end portion, a base connected to said bonnet in surrounding relation to said stem, said base having an end portion positioned in spaced relation with said piston end portion, a cylindrical housing enclosing said piston and said base, said housing having an internal wall, said housing internal wall and said spaced apart piston end portion and said base end portion forming a fluid chamber between said piston and said base, said piston outer cylindrical surface being longitudinally slidable on said housing internal wall, a passageway extending through said housing internal wall and communicating with said fluid chamber for admitting and releasing pressurized fluid to and from said fluid chamber for reciprocating said piston to open and close the valve, first seal means positioned between said base and said housing internal wall for maintaining a fluid-tight seal between said housing and said base, second seal means positioned between said piston and said housing internal wall for maintaining a fluid-tight seal therebetween as said piston reciprocates in said fluid chamber, said second seal means including an annular seal member having an inner edge and an outer edge, said piston outer cylindrical surface having a recess, said annular seal member inner edge positioned in said recess and said annular seal member outer edge positioned for slidable movement on said housing internal wall upon reciprocation of said piston, said annular seal member being movable with said piston with said annular seal member inner edge being maintained in sliding sealing engagement with said housing internal wall to prevent escape of fluid upwardly through said housing between said piston and said housing internal wall, a compression coil spring positioned on said stem and abutting said base at one end and acting on said stem at the other end, and said coil spring exerting a force on said stem to normally maintain said stem lower end portion engaging said valve seat in the absence of fluid in said fluid chamber to exert an upward force on said piston to raise said stem and open the valve.

2. A valve as set forth in claim 1 which includes, retaining means for connecting said housing to said base to permit rotation of said housing on said base to position said passageway at a preselected location around said base.

3. A valve as set forth in claim 2 in which, said housing includes an annular recess in said internal wall opposite said base, said retaining means including an annular member having one portion positioned in said annular recess and another portion positioned in engagement with said base, and said annular member positioned in said annular recess to connect said housing to said base and permit rotation of said housing relative to said base.

4. A valve as set forth in claim 3 in which, said annular member connects said housing to said base to maintain said housing and said base as an integral unit while facilitating rotation of said housing on said base to permit selective radial positioning of said passageway for connection to a source of the pressurized fluid.

5. A valve as set forth in claim 1 in which, said base includes an external surface contacting said housing internal wall below said passageway, said base external surface including a circumferential recess, said first seal means including an O-ring positioned in said circumferential recess, and said O-ring sealingly engaging said housing internal wall to form a seal between said base and said housing to prevent the escape of fluid therebetween from said fluid chamber.

6. A valve as set forth in claim 1 in which, said annular seal member includes an annular spring energized piston seal having an inverted U-shaped configuration.

7. A valve comprising, a valve body having a valve chamber therein, said valve chamber including an upper portion with an opening therethrough and a lower portion having a valve seat, inlet and outlet openings extending through said valve body and communicating with said valve seat, a bonnet positioned in said chamber upper portion and connected to said valve body, said bonnet having a passageway therethrough aligned with said chamber, a stem positioned for longitudinal movement in said bonnet passageway and including a lower end portion extending into said chamber lower portion and being adapted to sealingly engage said valve seat to thereby open and close said valve, said stem including an upper end portion extending above said bonnet, a piston connected to said stem upper end portion, a base extending into said bonnet passageway and surrounding said stem upper end portion, said base including an upper surface and a lower surface, means for securing said base to said bonnet to position said base in spaced relation with said piston to form a fluid chamber therebetween, a housing enclosing said piston and said base, said housing having an internal wall for supporting said piston for reciprocal movement in said fluid chamber, said housing internal wall including an annular shoulder positioned below said piston and an annular recess positioned below said base lower surface, said housing having an upper end portion and a lower end portion, said housing being rotatable on said base, a passsageway extending through said housing between said upper and lower end portions, an inlet port in said housing connected by said passageway to said fluid chamber for admitting and releasing pressurized fluid to and from said fluid chamber for reciprocating said piston to open and close the valve, said base upper surface abutting said housing internal wall annular shoulder, a retaining ring positioned for releasable insertion in said housing internal wall annular recess, said retaining ring abutting said base lower surface to maintain said base upper surface abutting against said housing internal wall annular shoulder, and said housing being supported by said base for rotation in a fixed axial position to permit rotation of said inlet port to a preselected position around said base on said bonnet.

8. A valve as set forth in claim 7 in which, said retaining ring connects said housing to said base to maintain said housing and said base as an integral unit while facilitating rotation of said housing on said base to permit selective radial positioning of said passageway for connection to a source of pressurized fluid.

9. A valve as set forth in claim 7 in which, said housing includes an open upper end portion and an integral shoulder surrounding said open upper end portion, a disc engaging said internal shoulder to close off said housing open upper end portion, an annular recess positioned in said housing internal wall below said internal shoulder, a retaining ring received in said annular recess in underlying relation with said disc, and said retaining ring abutting said disc to urge said disc upwardly into secured engagement with said housing internal shoulder and maintain said disc in position, closing off said housing open upper end portion to protect the interior of said housing from the entry of moisture and foreign debris.

10. A valve as set forth in claim 7 in which, said means for securing said base to said bonnet includes said base having an externally threaded lower end portion, said bonnet including an open upper end portion having an internally threaded portion, said base externally threaded lower end portion extending into engagement with said bonnet internally threaded portion, said base including an annular lower surface positioned above said externally threaded lower end portion, and said base extended into said bonnet open upper end portion to position said base annular lower surface into abutting contact with said bonnet open upper end portion to securely mount said base on said bonnet.

11. A valve comprising, a valve body having a valve chamber therein, said valve chamber including an upper portion with an opening therethrough and a lower portion having a valve seat, inlet and outlet openings extending through said valve body and communicating with said valve seat, a bonnet positioned in said chamber upper portion and connected to said valve body, said bonnet having a passageway therethrough aligned with said chamber, a stem positioned for longitudinal movement in said bonnet passageway and including a lower end portion extending into said chamber lower portion and being adapted to sealingly engage said valve seat to thereby open and close said valve, said stem including an upper end portion extending above said bonnet, a piston connected to said stem upper end portion, a base extending into said bonnet passageway and surrounding said stem upper end portion, means for securing said base to said bonnet to position said base in spaced relation with said piston to form a fluid chamber therebetween, a housing enclosing said piston and said base, said housing having an internal wall for supporting said piston for reciprocal movement in said fluid chamber, said housing having a lower end portion rotatably supported by said base, said housing having an upper end portion with an inlet port and a passageway extending from said inlet port through said housing between said upper and lower end portions, said passageway communicating with said fluid chamber for admitting and releasing pressurized fluid to and from said fluid chamber for reciprocating said piston to open and close the valve, retaining means for rotatably connecting said housing to said base at said housing lower end portion to permit rotation of said housing in a fixed axial position on said base to position said passageway and said inlet port at a preselected radial location around said base, first seal means position between said base and said housing internal wall for maintaining a fluid-tight seal between said housing and said base, second means supported by said piston and positioned between said piston and said housing internal wall for maintaining a fluid-tight seal therebetween as said piston reciprocates in said fluid chamber, said second seal means including an annular spring energized piston seal carried by said piston for slidable movement on said housing internal wall, said annular spring energized piston seal being securely connected to said piston and movable with said piston to provide a slidable seal arrangement between said piston and said housing internal wall, a compression coil spring positioned on said stem and abutting said base at one end and acting on said stem at the other end, said coil spring exerting a force on said stem to normally maintain said stem lower end portion engaging said valve seat in the absence of fluid in said fluid chamber to exert an upward force on said piston to raise said stem and open the valve, a bellows surrounding said stem lower end portion in said bonnet passageway, said bellows having an upper end and a lower end, and means for connecting said bellows upper end to said stem lower end portion below said coil spring and said bellows lower end to said valve body to provide a seal around said valve stem between said coil spring and said valve body.

* * * * *